US012562092B2

(12) United States Patent
Ning

(10) Patent No.: US 12,562,092 B2
(45) Date of Patent: Feb. 24, 2026

(54) COMPENSATION VALUE GENERATION METHOD, APPARATUS THEREOF, AND DISPLAY PANEL THEREOF

(71) Applicant: TCL CHINA STAR OPTOELECTRONICS TECHNOLOGY CO., LTD., Shenzhen (CN)

(72) Inventor: Fan Ning, Shenzhen (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/401,524

(22) Filed: Dec. 31, 2023

(65) Prior Publication Data

US 2025/0191509 A1 Jun. 12, 2025

(30) Foreign Application Priority Data

Dec. 8, 2023 (CN) ......................... 202311693040.4

(51) Int. Cl.
*G09G 3/20* (2006.01)

(52) U.S. Cl.
CPC ... *G09G 3/2007* (2013.01); *G09G 2300/0452* (2013.01); *G09G 2320/0233* (2013.01); *G09G 2320/0626* (2013.01); *G09G 2320/0666* (2013.01)

(58) Field of Classification Search
CPC ......... G09G 3/2007; G09G 2300/0452; G09G 2320/0233; G09G 2320/0626; G09G 2320/0666
See application file for complete search history.

(56) References Cited

U.S. PATENT DOCUMENTS 11,626,086 B1 * 4/2023 Hei .......................... G09G 5/10 345/690
2012/0062754 A1 * 3/2012 Huang ................... H04N 23/68 348/208.99
2012/0262475 A1 * 10/2012 Frank ................. H04N 1/40075 345/597
2013/0321671 A1 * 12/2013 Cote .................... H04N 25/677 348/241
2017/0352317 A1 * 12/2017 Huang .............. G02F 1/134309
2019/0206343 A1 * 7/2019 Kang ................... G09G 3/3607
(Continued)

*Primary Examiner* — Md Saiful A Siddiqui
(74) *Attorney, Agent, or Firm* — The Roy Gross Law Firm, LLC; Roy D. Gross

(57) ABSTRACT

The present invention provides a compensation value generation method, an apparatus thereof, and a display panel thereof. The method includes: obtaining at least one optical message of a display panel under at least one tie point grayscale, and determining whether color cast exists the display panel under the tie point grayscale according to optical message, when color cast exists, adopting a first compensation method to compensate the tie point grayscale to obtain a first compensation value, when no color cast exists, then adopting a second compensation method to compensate the tie point grayscale to obtain a second compensation value. Also, a data amount of the second compensation value is different from a data amount of the first compensation value to mitigate the color cast of the display image while lowering the storage cost.

15 Claims, 8 Drawing Sheets

(56) References Cited

U.S. PATENT DOCUMENTS

| | | | | |
|---|---|---|---|---|
| 2020/0027409 | A1* | 1/2020 | Shan | G09G 3/3607 |
| 2020/0227006 | A1* | 7/2020 | Yao | G09G 3/006 |
| 2021/0264865 | A1* | 8/2021 | Qiu | G09G 3/3208 |
| 2022/0051601 | A1* | 2/2022 | Lin | G09G 3/2003 |
| 2023/0134326 | A1* | 5/2023 | Lee | G09G 3/3233<br>345/690 |

* cited by examiner

COMPENSATION VALUE GENERATION METHOD, APPARATUS THEREOF, AND DISPLAY PANEL THEREOF

CROSS REFERENCE TO RELATED APPLICATIONS

This application claims the priority to Chinese Patent Application No. 202311693040.4, filed on Dec. 8, 2023. The entire disclosures of the above application are incorporated herein by reference.

FIELD OF INVENTION

The present invention relates to a field of display technologies, especially to display device manufacturing, and particularly to a compensation value generation method, an apparatus thereof, and a display panel thereof.

BACKGROUND OF INVENTION

A display terminal, serving as a terminal for displaying texts, images, and other messages, plays an irreplaceable role in the visual transmission of messages.

During the production process of the display terminal, due to material and process factors, the display panel image may exhibit conditions of uneven brightness and uneven chroma. At this time, it is necessary to perform brightness compensation or chroma compensation on the display panel to enhance the uniformity of the displayed image. However, the data amount required for chroma compensation is several times that of brightness compensation. Additionally, conventional display terminals typically adopt brightness compensation or chroma compensation during the manufacturing process, resulting in a more severe color cast phenomenon in the displayed image or higher storage costs.

Therefore, conventional display terminals are unable to simultaneously address the improvement of the color cast in the displayed image and the reduction of storage costs. There is an urgent need for improvement in this regard.

SUMMARY OF INVENTION

An objective of the present invention is to provide a compensation value generation method, an apparatus thereof, and a display panel thereof to mitigate a technical issue of a conventional display terminal unable to mitigate color cast of a display image while lowering a storage cost.

The present invention provides a compensation value generation method, for generating a compensation value applied to a display panel, and comprising:

- obtaining at least one optical message of the display panel under at least one tie point grayscale, wherein each of the at least one tie point grayscale comprises a corresponding one of the at least one optical message;
- determining whether color cast exists in the display panel under the tie point grayscale according to the optical message;
- when the color cast exits in the display panel under the tie point grayscale, adopting a first compensation method to compensate the tie point grayscale to obtain a first compensation value; and
- when no color cast exists in the display panel under the tie point grayscale, adopting a second compensation method to compensate the tie point grayscale to obtain a second compensation value, a data amount of the second compensation value is different from a data amount of the first compensation value;
- wherein the compensation value comprises at least one of the first compensation value and the second compensation value.

In some embodiments, the display panel comprises a plurality of pixel units, each of the pixel units at least comprises a first sub-pixel and a second sub-pixel in different colors, the optical message comprises a first optical message corresponding to the first sub-pixel and a second optical message corresponding to the second sub-pixel; and

- the step of adopting a first compensation method to compensate the tie point grayscale to obtain a first compensation value, comprises:
- obtaining a reference color cast message, determining a first sub-compensation value of the first sub-pixel under the tie point grayscale and a second sub-compensation value of the second sub-pixel under the tie point grayscale according to the first optical message, the second optical message, and the reference color cast message, wherein the first compensation value comprises the first sub-compensation value and the second sub-compensation value.

In some embodiments, the step of adopting a second compensation method to compensate the tie point grayscale to obtain a second compensation value, comprises:

- obtaining a reference brightness message, and according to the first optical message, the second optical message, and the reference brightness message, determining the same second compensation value of the first sub-pixel and the second sub-pixel under the tie point grayscale.

In some embodiments, the step of determining whether color cast exists in the display panel under the tie point grayscale according to the optical message, comprises:

- generating an actual color cast message according to the first optical message and the second optical message; and
- obtaining the reference color cast message, and determining whether color cast exists in the display panel under the tie point grayscale according to the actual color cast message and the reference color cast message.

In some embodiments, the step of at least one optical message of the display panel under at least one tie point grayscale, comprises:

- dividing the display panel in a plurality of regions; and
- obtaining at least one first sub-optical message of the first sub-pixel in each of the regions under the at least one tie point grayscale, and obtaining at least one second sub-optical message of the second sub-pixel in each of the regions under the at least one tie point grayscale, wherein the first optical message comprises the at least one first sub-optical message or the first optical message is determined according to the at least one first sub-optical message, and the second optical message comprises the at least one second sub-optical message or the second optical message is determined according to the at least one second sub-optical message.

In some embodiments, the step of determining whether color cast exists in the display panel under the tie point grayscale according to the optical message, comprises:

- generating an actual sub-color cast message correspondingly according to the first sub-optical message and a corresponding one of the at least one second sub-optical message; and
- obtaining the reference color cast message, and determining whether color cast exists in a corresponding one of the regions under the tie point grayscale according to the actual sub-color cast message and the reference color cast message to determine whether color cast exists in the display panel under the tie point grayscale.

In some embodiments, a quantity of the compensation value is greater than 1, a quantity of the compensation value is greater than 1, a plurality of the compensation value comprises a plurality of tie point compensation values corresponding to a plurality of the tie point grayscales, after obtaining at least one of the at least one first compensation value and the at least one second compensation value as the tie point compensation values, the method further comprises:

according to two of the tie point compensation values corresponding to adjacent two of the tie point grayscales, calculating a third compensation value corresponding to a non-tie point grayscale between adjacent two of the tie point grayscales, and the compensation value further comprises the third compensation value.

In some embodiments, after at least one of the step of adopting a first compensation method to compensate the tie point grayscale to obtain a first compensation value and the step of adopting a second compensation method to compensate the tie point grayscale to obtain a second compensation value, the method further comprises:

generating a compensation table comprising a first format according to the first compensation values, the second compensation values, or the at least one first compensation value, and the at least one second compensation value; and generating compensation data comprising a second format according to the compensation table, wherein the compensation data comprises the compensation values and compensation values type data corresponding to the compensation values, the compensation values are constituted by the first compensation values or the second compensation values, or the compensation values are constituted by the at least one first compensation value and the at least one second compensation value, each of the compensation value type data is configured to indicate a corresponding one of the compensation values as the first compensation value or the second compensation value.

In some embodiments, the display panel comprises a plurality of pixel units, each of the pixel units at least comprises a first sub-pixel and a second sub-pixel in different colors, the optical message comprises a first optical message corresponding to the first sub-pixel and a second optical message corresponding to the second sub-pixel; and the step of adopting a first compensation method to compensate the tie point grayscale to obtain a first compensation value, comprises:

obtaining a reference color cast message, determining a first sub-compensation value of the first sub-pixel under the tie point grayscale and a second sub-compensation value of the second sub-pixel under the tie point grayscale according to the first optical message, the second optical message, and the reference color cast message, wherein the first compensation value comprises the first sub-compensation value and the second sub-compensation value;

a quantity of the compensation value is greater than 1, a plurality of the compensation value comprises a plurality of tie point compensation values corresponding to a plurality of the tie point grayscales, after obtaining at least one of the at least one first compensation value and the at least one second compensation value as the tie point compensation values, the method further comprises:

according to two of the tie point compensation values corresponding to adjacent two of the tie point grayscales, calculating a third compensation value corresponding to a non-tie point grayscale between adjacent two of the tie point grayscales, and the compensation value further comprises the third compensation value.

In some embodiments, the step of adopting a second compensation method to compensate the tie point grayscale to obtain a second compensation value, comprises:

obtaining a reference brightness message, and according to the first optical message, the second optical message, and the reference brightness message, determining the same second compensation value of the first sub-pixel and the second sub-pixel under the tie point grayscale.

In some embodiments, the step of determining whether color cast exists in the display panel under the tie point grayscale according to the optical message, comprises:

generating an actual color cast message according to the first optical message and the second optical message; and obtaining the reference color cast message, and determining whether color cast exists in the display panel under the tie point grayscale according to the actual color cast message and the reference color cast message.

In some embodiments, the step of obtaining at least one optical message of the display panel under at least one tie point grayscale, comprises:

dividing the display panel in a plurality of regions; and obtaining at least one first sub-optical message of the first sub-pixel in each of the regions under the at least one tie point grayscale, and obtaining at least one second sub-optical message of the second sub-pixel in each of the regions under the at least one tie point grayscale, wherein the first optical message comprises the at least one first sub-optical message or the first optical message is determined according to the at least one first sub-optical message, and the second optical message comprises the at least one second sub-optical message or the second optical message is determined according to the at least one second sub-optical message.

In some embodiments, the step of determining whether color cast exists in the display panel under the tie point grayscale according to the optical message, comprises:

generating an actual sub-color cast message correspondingly according to the first sub-optical message and a corresponding one of the at least one second sub-optical message; and obtaining the reference color cast message, and determining whether color cast exists in a corresponding one of the regions under the tie point grayscale according to the actual sub-color cast message and the reference color cast message to determine whether color cast exists in the display panel under the tie point grayscale.

In some embodiments, after at least one of the step of adopting a first compensation method to compensate the tie point grayscale to obtain a first compensation value and the step of adopting a second compensation method to compensate the tie point grayscale to obtain a second compensation value, the method further comprises:

generating a compensation table comprising a first format according to the first compensation values, the second compensation values, or the at least one first compensation value, and the at least one second compensation value; and generating compensation data comprising a second format according to the compensation table, wherein the compensation data comprises the compensation values and compensation values type data corresponding to the compensation values, the compensation values are constituted by the first compensation values or the second compensation values, or the compensation values are constituted by the at least one first compensation value and the at least one second compensation value, each of the compensation value type data is configured to indicate a corresponding one of the compensation values as the first compensation value or the second compensation value.

The present invention also provides a display panel, comprising:

a display panel main body;

a memory configured to store any one of the above compensation values; and a controller configured to drive the display panel main body to emit light according to any one of the above compensation values.

The present invention also provides a compensation value generation apparatus, for generating a compensation value applied to a display panel, and comprising:

an obtaining module configured to obtain at least one optical message of the display panel under at least one tie point grayscale;

a determination module configured to determine whether color cast exists in the display panel under the tie point grayscale according to the optical message; and a compensation module configured to adopt a first compensation method to compensate the tie point grayscale to obtain a first compensation value when the color cast exits in the display panel under the tie point grayscale, and configured to adopt a second compensation method to compensate the tie point grayscale to obtain a second compensation value when no color cast exists in the display panel under the tie point grayscale, wherein a data amount of the second compensation value is different from a data amount of the first compensation value;

wherein the compensation value comprises at least one of the first compensation value and the second compensation value.

In some embodiments, the display panel comprises a plurality of pixel units, each of the pixel units at least comprises a first sub-pixel and a second sub-pixel in different colors, the optical message comprises a first optical message corresponding to the first sub-pixel and a second optical message corresponding to the second sub-pixel; and the compensation module is configured to:

obtain a reference color cast message, determine a first sub-compensation value of the first sub-pixel under the tie point grayscale and a second sub-compensation value of the second sub-pixel under the tie point grayscale according to the first optical message, the second optical message, and the reference color cast message, wherein the first compensation value comprises the first sub-compensation value and the second sub-compensation value.

In some embodiments, the compensation module is configured to:

obtain a reference brightness message, and according to the first optical message, the second optical message, and the reference brightness message, determine the same second compensation value of the first sub-pixel and the second sub-pixel under the tie point grayscale.

In some embodiments, the determination module is further configured to:

generate an actual color cast message according to the first optical message and the second optical message; and obtain the reference color cast message, and determine whether color cast exists in the display panel under the tie point grayscale according to the actual color cast message and the reference color cast message.

In some embodiments, the obtaining module is further configured to:

divide the display panel in a plurality of regions; and obtain at least one first sub-optical message of the first sub-pixel in each of the regions under the at least one tie point grayscale, and obtain at least one second sub-optical message of the second sub-pixel in each of the regions under the at least one tie point grayscale, wherein the first optical message comprises the at least one first sub-optical message or the first optical message is determined according to the at least one first sub-optical message, and the second optical message comprises the at least one second sub-optical message or the second optical message is determined according to the at least one second sub-optical message.

The present invention provides a compensation value generation method, an apparatus thereof, and a display panel thereof, the method obtains at least one optical message of a display panel under at least one tie point grayscale, and determines whether color cast exists in the display panel under the tie point grayscale according to the optical message. Under two conditions of existence of the color cast and non-existence of the color cast, a first compensation method is adopted to compensate the tie point grayscale to obtain a first compensation value, and a second compensation method is adopted to compensate the tie point grayscale to obtain second compensation value, respectively. Also, a data amount of the second compensation value is different from a data amount of the first compensation value. The above method prevents the display panel from using the same compensation method under all tie point grayscales to generate the above first compensation value or second compensation value to mitigate the color cast of the display image while lowering the storage cost.

DESCRIPTION OF DRAWINGS

The following further explains the present invention through the attached drawings. It should be noted that the drawings in the following description are only used to elucidate some embodiments of the present invention. For those skilled in the art, additional drawings can be obtained without exerting inventive effort based on these drawings.

DETAILED DESCRIPTION OF PREFERRED EMBODIMENTS

The technical solution in the embodiment of the present application will be clearly and completely described below with reference to the accompanying drawings in the embodiments of the present application. Apparently, the described embodiments are merely some embodiments of the present application instead of all embodiments. According to the embodiments in the present application, all other embodiments obtained by those skilled in the art without making any creative effort shall fall within the protection scope of the present application.

In descriptions of the present invention, terminologies “first”, “second” are only for the purposes of description, and cannot be understood as indication or implication of comparative importance or a number of technical features. Therefore, a feature limited with “first”, “second” can expressly or implicitly include one or more features. Additionally, it should be noted that the drawings provided depict structures closely related to the present invention, omitting some details that are not significantly relevant to the invention. The purpose is to simplify the drawings, making the key aspects of the invention easily discernible, rather than implying that the actual device is identical to the drawings and imposing restrictions on the configuration of the device in practice.

“Embodiment” mentioned in the specification means that specific features, structures, or characteristics described in combination with the embodiments can be included in at least one embodiment of the present invention. Terminologies presenting at each location of the specification do not necessarily refer to the same embodiment, and is either not an individual or backup embodiment mutually exclusive to other embodiment. A person of ordinary skill in the art can explicitly or implicitly understand that the embodiment described in the specification can combine other embodiment.

The present invention provides a compensation value generation method configured to generate a compensation value applied to a display panel. The method comprises but is not limited to the following embodiments and a combination of the following embodiments.

Figure 1:
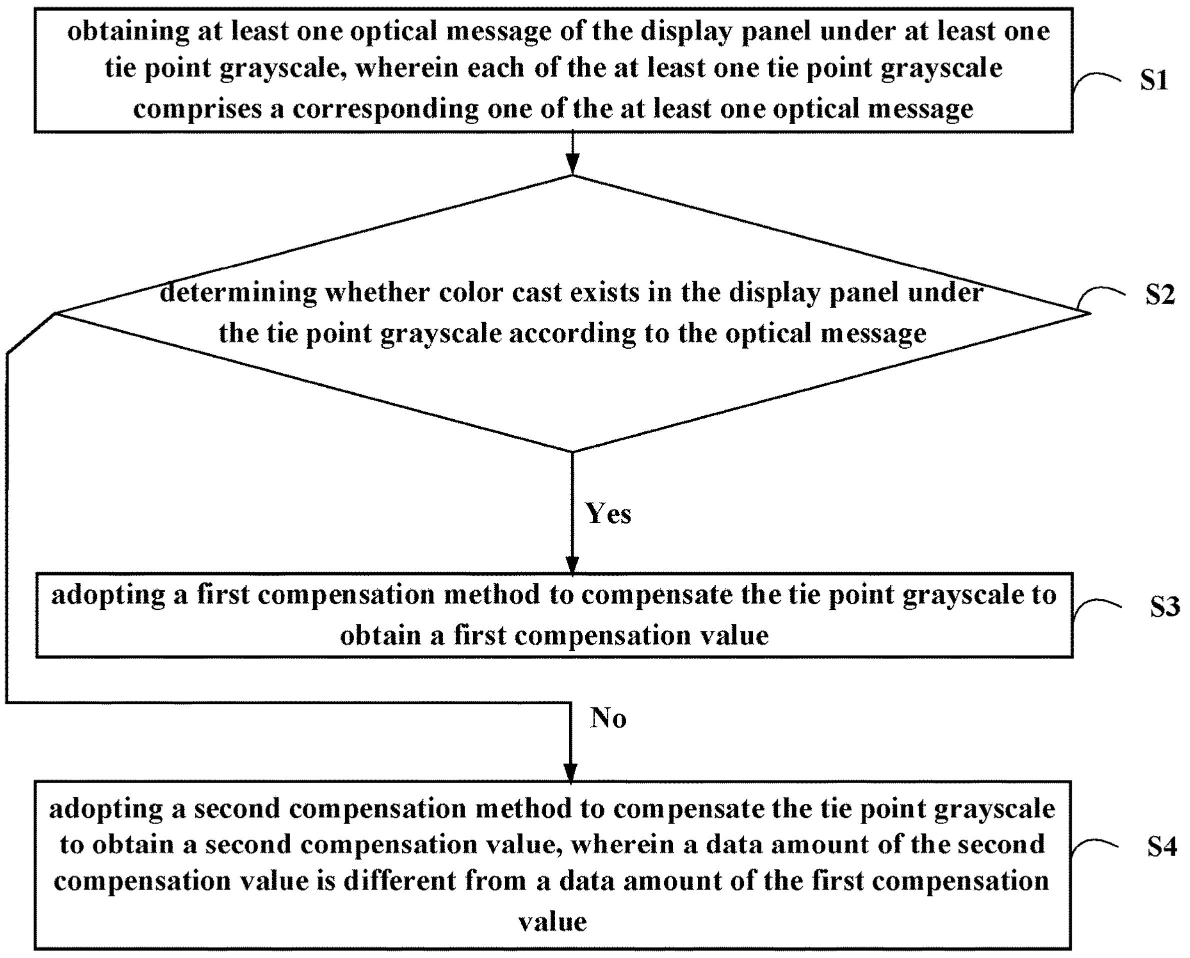
FIG. 1 is a first flowchart of a compensation value generation method provided by an embodiment of the present invention.

In some embodiments, with reference to FIG. 1, the compensation value generation method comprises but is not limited to the following steps and a combination of the steps.

A step S1 comprises obtaining at least one optical message of the display panel under at least one tie point grayscale, wherein each of the at least one tie point grayscale comprises a corresponding one of the at least one optical message.

The display panel of the present embodiment can comprise but is not limited to at least one of liquid crystal display panel, organic self-luminous display panel, and inorganic self-luminous display panel. In particular, display panel can comprise a plurality of pixel units. Each of the pixel units at least comprises a first sub-pixel and a second sub-pixel in different colors. Here the pixel units further comprising a third sub-pixel including a color different from that of the first sub-pixel and that of the second sub-pixel are used as an example for explanation, and no limit is applied to the above three colors of the sub-pixels, for example, colors of the three can be red, green, and blue respectively.

It can be understood that for a sub-pixel of any color, a plurality of grayscale values in a grayscale range can be accessed, and also can be applied with a data voltage under each grayscale value to emit light of corresponding brightness. A brightness value of light emitted from the sub-pixel and its corresponding grayscale value can comply with a gamma curve corresponding to the sub-pixel. Gamma curves of sub-pixels of different colors can be the same or different. The optical message of the step S1 here can be understood as a general term of light emitting brightness values under effect of data voltages of all pixel units in the display panel under the tie point grayscale, it is not designated specifically, and is intended to indicate the optical message corresponding to the tie point grayscale, and no limit is applied to a quantity of tie point grayscales that need to acquire an optical message.

A step S2 comprises determining whether color cast exists in the display panel under the tie point grayscale according to the optical message.

On the basis of the pixel unit of the display panel comprising the first sub-pixel and the second sub-pixel, the optical message can comprise a first optical message corresponding to the first sub-pixel and a second optical message corresponding to the second sub-pixel. Namely, step S1 can be understood as obtaining a first optical message of the first sub-pixel of the display panel under each tie point grayscale and obtaining a second optical message of the second sub-pixel of the display panel under each tie point grayscale.

Similarly, the first optical message and the second optical message here can be understood as general terms of light emitting brightness values under the effect of data voltages of all first sub-pixels and all second sub-pixels in the display panel under the tie point grayscale, it is not designated specifically, and is intended to indicate that the first optical message and the second optical message correspond to the tie point grayscales.

Figure 2:
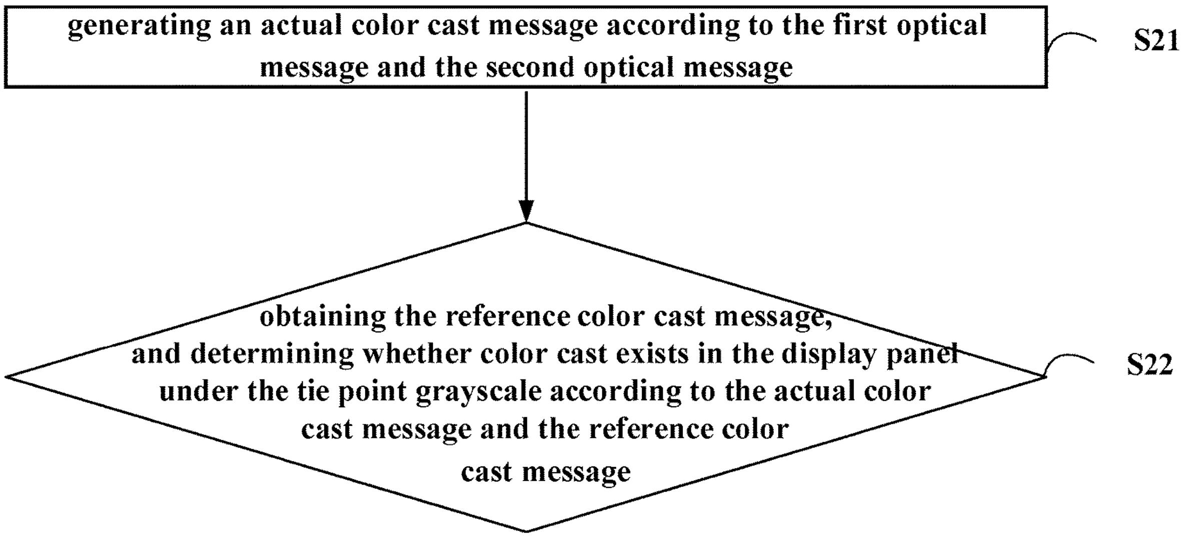
FIG. 2 is a flowchart of a step S2 in FIG. 1 provided by the embodiment of the present invention.

Furthermore, with reference to FIG. 2, the above step S2 can comprise but is not limited to the following step(s).

A step S21 comprises generating an actual color cast message according to the first optical message and the second optical message.

It should be noted that although both the first sub-pixel and the second sub-pixel emit light under the effect of the data voltage corresponding to the same tie point grayscale, due to different material and processes, a difference exists between the above first optical message and the second optical message. The actual color cast message in the step S21 here can represent a difference degree between the first optical message and the second optical message.

For example, but it is not limited to that, the first optical message here can refer to an average value of optical messages of all first sub-pixels in the entire display panel. The second optical message here can refer to an average value of optical messages of all second sub-pixels in the entire display panel. At this time, calculation of the first sub-optical message and the second sub-optical message of each of the regions can be used for compensation to each of the regions in a later stage.

A step S22 comprises obtaining the reference color cast message, and determining whether color cast exists in the display panel under the tie point grayscale according to the actual color cast message and the reference color cast message.

The reference color cast message can be disposed according to actual condition and demands. Here it can be understood as a standard for evaluating whether color cast of the display panel exists under the tie point grayscale. Namely, whether the above color cast exists in the display panel is determined by comparing values of the actual color cast message and the reference color cast message.

Figure 3:
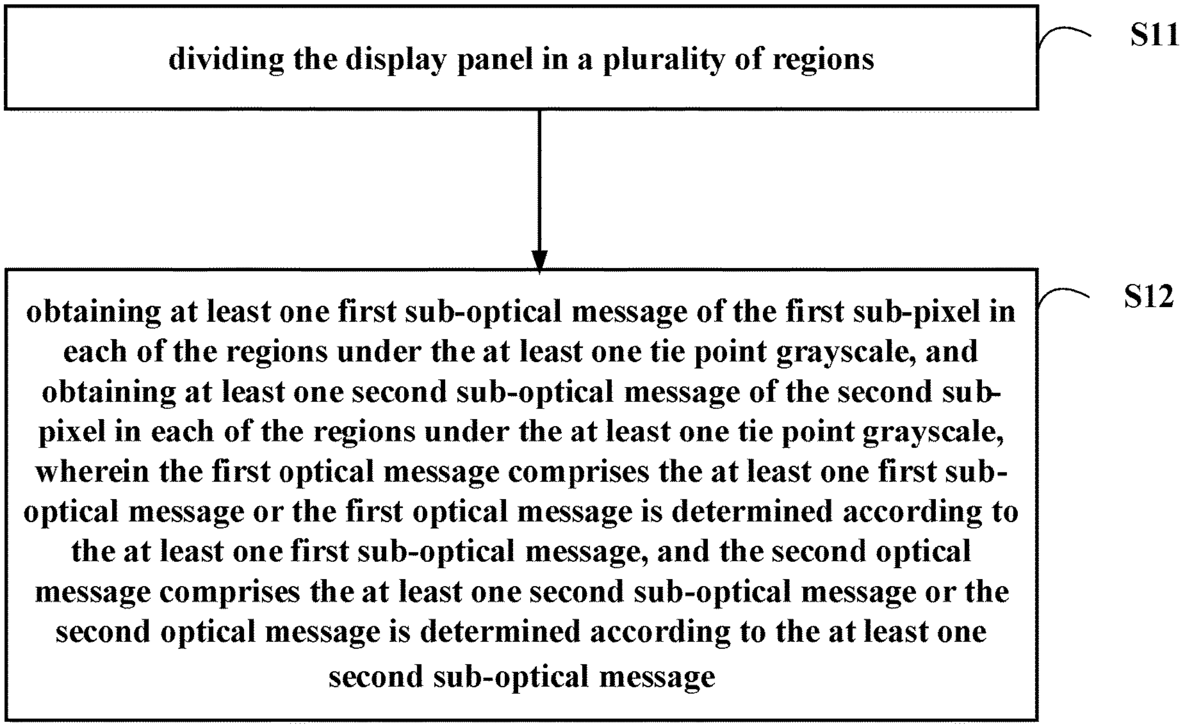
FIG. 3 is a flowchart of a step S1 in FIG. 1 provided by the embodiment of the present invention.

In some embodiments, with reference to FIG. 3, the above step S1 can comprise but is not limited to the following step(s).

A step S11 comprises dividing the display panel in a plurality of regions.

Here is no limit to a dividing method for a plurality of regions in the display panel, as long as it fulfills that the regions can constitute an entire display region. sizes of the regions can be the same or different.

A step S12 comprises obtaining at least one first sub-optical message of the first sub-pixel in each of the regions under the at least one tie point grayscale, and obtaining at least one second sub-optical message of the second sub-pixel in each of the regions under the at least one tie point grayscale, wherein the first optical message comprises the at least one first sub-optical message or the first optical message is determined according to the at least one first sub-optical message, and the second optical message comprises the at least one second sub-optical message or the second optical message is determined according to the at least one second sub-optical message.

It can be understood in combination with the above descriptions that each of the regions can comprise a plurality of pixel units, namely, each of the regions can comprise a plurality of first sub-pixels and a plurality of second sub-pixels. Under the same tie point grayscale, the first sub-pixels in different regions can comprise one first sub-optical message, and the second sub-pixel in different regions can comprise one second sub-optical message. The first sub-optical message and the second sub-optical message here also can be general terms of brightness values under the effect of data voltages of the first sub-pixels and the second sub-pixels in corresponding regions under the tie point grayscale.

In particular, here uses the first sub-optical message as an example for explanation. The first sub-optical message can correspond to a light emitting brightness value under the effect of a data voltage of the first sub-pixel in a central location in the regions under the tie point grayscale, and can also be correspond to an average value of light emitting brightness values under effect of the data voltages of a plurality of first sub-pixels (for example, it can be all first sub-pixels or some of the first sub-pixels) in the regions under the tie point grayscale.

Determining the first optical message according to a plurality of first sub-optical messages can be understood as that the first optical message is equal to a sum or an average value of a plurality of first sub-optical messages. Determining the second optical message according to a plurality of second sub-optical messages can be understood as a second optical message is equal to a sum or an average value of a plurality of second sub-optical messages. At this time, the above step S2 can be understood as to deem a plurality of regions as a whole to determine only one first optical message and only one second optical message. At this time, an actual color cast message generated in the step S21 is also the only one, namely, it corresponds to all regions of the entire display panel. At this time, dividing the regions can perform a function of calculating the first optical message and the second optical message.

Figure 4:
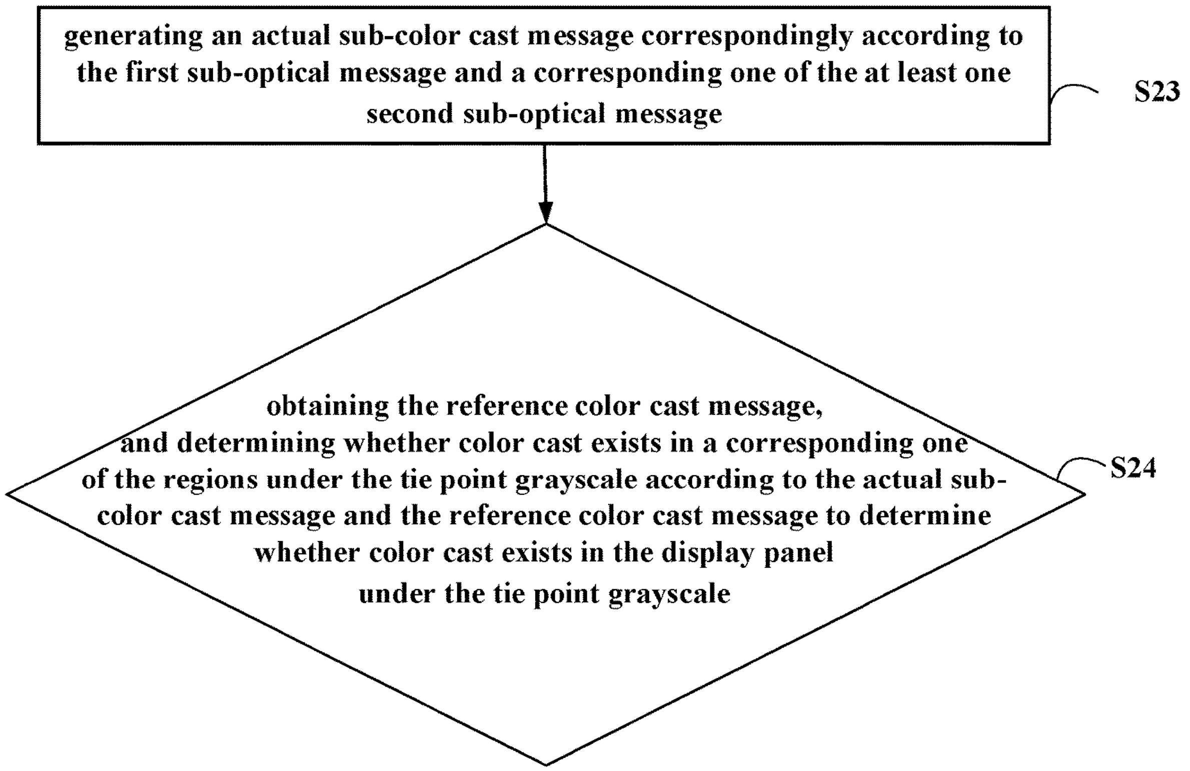
FIG. 4 is a flowchart of the step S2 in FIG. 1 provided by the embodiment of the present invention.

When the first optical message comprises a plurality of first sub-optical messages corresponding to a plurality of regions, the second optical message comprises a plurality of second sub-optical messages corresponding to a plurality of regions. With reference to FIG. 4, the above step S2 can comprise but is not limited to the following step(s).

A step S23 comprises generating an actual sub-color cast message correspondingly according to the first sub-optical message and a corresponding one of the at least one second sub-optical message.

It can be understood that each of the regions comprises an actual sub-color cast message correspondingly according to a corresponding first sub-optical message and a corresponding second sub-optical message, and each actual sub-color cast message can express a color cast degree of a corresponding region. the calculation method of the earlier mentioned actual color cast message and here actual sub-color cast message is not specified. For example, the actual sub-color cast message only needs to be determined according to the first sub-optical message and the second sub-optical message of the corresponding region.

In combination with the above steps S11 to S12 and the step S23 here, the following step, which is not a limit, can be used to calculate an actual sub-color cast message:

(a) converting a picture from a RGB color space to a Commission internationale de l'èclairage (CIE, International Commission on Illumination) Lab color space.

In particular, it can be understood as each of the sub-pixels in the display panel is controlled to emit light under an effect a data voltage of one of the tie point grayscales first, a brightness value of each of the sub-pixels in each of the pixel units (it can be understood that the brightness value belongs to the RGB color space) can be obtained by an optical instrument. For convenience of description, each of the pixel units comprising a first sub-pixel, a second sub-pixel, and a third sub-pixel, and each of the regions comprising a corresponding first sub-optical message (i.e., the brightness value R of the first sub-pixel), a corresponding second sub-optical message (i.e., the brightness value G of the second sub-pixel) and a corresponding third sub-optical message (i.e., the brightness value B of the third sub-pixel) are used as an example for explanation.

The RGB color space can be converted to a XYZ color space by a matrix first, namely, according to the brightness value R of the first sub-pixel, the brightness value G of the second sub-pixel and the brightness value B of the third sub-pixel, a stimulus value X of a first sub-pixel, a stimulus value Y of a second sub-pixel, and a stimulus value Z of a third sub-pixel are generated, and a specific conversion process can be as follows:

$$\begin{bmatrix} X \\ Y \\ Z \end{bmatrix} = \begin{bmatrix} 0.412453 & 0.357580 & 0.180423 \\ 0.212671 & 0.715160 & 0.072169 \\ 0.019334 & 0.119193 & 0.950227 \end{bmatrix} \begin{bmatrix} R \\ G \\ B \end{bmatrix};$$

X=0.412453*R+0.357580*G+0.180423*B, and so on, and Y, Z can also be acquired. Of course, a specific value of an element in the matrix can be adjusted and is not limited as the above 9 values.

Furthermore, the XYZ color space can be converted to the CIE Lab color space by the formula. Namely, a value L*, a chroma a* (indicating a red-green color degree), and a chroma b* (indicating a yellow-green color degree) are generated according to the stimulus value X of the first sub-pixel, the stimulus value Y of the second sub-pixel, and the stimulus value Z of the third sub-pixel. A specific conversion process can be as follows;

$$L^* = 116 f\left(\frac{Y}{Y_n}\right) - 16$$

$$a^* = 500\left[f\left(\frac{X}{X_n}\right) - f\left(\frac{Y}{Y_n}\right)\right]$$

$$b^* = 200\left[f\left(\frac{Y}{Y_n}\right) - f\left(\frac{Z}{Z_n}\right)\right]$$

$$f(t)\begin{cases} t^{1/3} & , t > \left(\frac{6}{29}\right)^3 \\ \frac{1}{3}\left(\frac{29}{6}\right)^2 t + \frac{4}{29} & , t \le \left(\frac{6}{29}\right)^3 \end{cases}$$

Xn, Yn, Zn can refer to three stimulus values of a white point. Similarly, a specific value in the above several formulas can be adjusted and is not limited in the above several values. It can be known in combination with the above described, when a*>0, a greater value indicates the color being more red. When a*<0, a smaller value indicates the color being more green. When b*>0, a greater value indicates the color being more yellow. When b*<0, a smaller value indicates the color being more blue. Namely, a*, b* can refer to a critical color cast degree, a*=b*=0 refers to no color cast.

It should be noted that the CIE Lab color space is a color structure developed and made by Commission internationale de l'éclairage (CIE, International Commission on Illumination), and its gamut is greater than a gamut of the RGB color space, which implements a wider color range and can express any color message in the color space. It is a color space irrelevant to an apparatus and describes visual characteristics of human's eyes in a digitized method.

(b) based on the divided regions and parameters of the CIE Lab color space of each of the pixel units of the display panel, an actual sub-color cast message delt E of each of the regions can be calculated;

In particular, for each of the regions, an average values $\overline{L}$* of a plurality of L*, an average value $\overline{a}$* of a plurality of a*, and average value $\overline{b}$* of a plurality of b* of a plurality of pixel units can be calculated, and an actual sub-color cast message delt E of each region can be further calculated out by the above average values. A specific conversion process can be as follows;

$$delt\,E = \left[\left(L0^* - \overline{L}^*\right)^2 + (a_0^* - \overline{a}^*)^2 + \left(b_{0\_}^*\overline{b}^*\right)^2\right]^{1/2};$$

$L_0$*, $a_0$*, $b_0$* are an average value of three parameters of a standard image in the CIE Lab color space. The standard image can be a light emitting image of a central region of the present display panel under the tie point grayscale, and also can be a light emitting image of a standard display panel under the tie point grayscale. It can be understood in combination with the above descriptions that the greater the delt E is, the more critical the color cast of the region is.

A step S24 comprises obtaining the reference color cast message, and determining whether color cast exists in a corresponding one of the regions under the tie point grayscale according to the actual sub-color cast message and the reference color cast message to determine whether color cast exists in the display panel under the tie point grayscale.

As described above, the reference color cast message can be understood as a standard for evaluating whether color cast exists in the display panel under the tie point grayscale. whether the above color cast issue exists in the region can be determined according to a relationship between values of the actual sub-color cast message and the reference color cast message of each of the regions. When an actual sub-color cast message delt E in the region is greater than the reference color cast message, it can be considered that color cast exists in the region under the tie point grayscale. Namely, the color cast exits in the display panel under the tie point grayscale. Of course, when actual color cast message is equal to an average value of a plurality of actual sub-color cast messages delt E, or is equal to an average value of color cast messages of each of the pixel units, then the actual color cast message at this time can directly indicate whether color casts exists in the entire display panel. Namely, as long as the actual color cast message is greater than the reference color cast message, color cast exists in the display panel.

It should be noted that when the first optical message and the second optical message indicate an average value of optical messages of all first sub-pixels in the entire display panel and an average value of optical messages of all second sub-pixels respectively, the entire display panel can only have one $\overline{L}$*, one $\overline{a}$*, and one $\overline{b}$*, and the three are an average value of all L*, an average value of all a*, and an average value of all b* in all pixel units in the display panel.

Subsequent to the descriptions of the above steps S1 to S2, after the step S2, the method needs to implement the following step:

When the color cast exits in the display panel under the tie point grayscale, then a step as follows is implemented:

A step S3 comprises adopting a first compensation method to compensate the tie point grayscale to obtain a first compensation value.

It can be understood that at this time when color cast exists in the display panel under the tie point grayscale, specifically it can be that color cast exists at least one region in the display panel under the tie point grayscale, then in the step S3, compensation method (so called first compensation method) can be adopted to compensate the tie point grayscale to obtain a first compensation value.

Specifically, it can be understood that the first compensation method is adopted to compensate each of the regions to obtain a compensation value of the region under the bonding grayscale. At this time, compensation values of the regions are compensation values of the same type. It can also be understood that the first compensation method is adopted to compensate each of the regions only having color cast to obtain a compensation value of the region under the bonding grayscale. At this time, only the compensation value of some regions having the same type constitutes the first compensation value.

When no color cast exists in the display panel under the tie point grayscale, then a step as follows is implemented:

a step S4 comprising adopting a second compensation method to compensate the tie point grayscale to obtain a second compensation value, wherein a data amount of the second compensation value is different from a data amount of the first compensation value.

It is different that at this time when no color cast exists in the display panel under the tie point grayscale, specifically, it can be that no color cast exists in each of the regions in the display panel under the tie point grayscale, then in the step S4, another compensation method (so called second compensation method) different from first compensation method can be adopted to compensate the tie point grayscale to obtain a second compensation value.

Specifically, it can be understood that the second compensation method is adopted to compensate each of the regions to obtain a second sub-compensation value of the regions under the bonding grayscale. At this time, second sub-compensation values of the regions are compensation values of the same type. It can also be understood that the second compensation method is adopted to only compensate each of the regions having no color cast to obtain second sub-compensation value of the region under the bonding grayscale. At this time, only some of the regions comprise second compensation values of the same type. Namely, under the tie point grayscale. Some of the regions have the first compensation values, and another some of the regions have the second compensation values.

It should be noted that a data amount of the second compensation value is different from a data amount of the first compensation value. Namely, compensation values of two types must have a value relationship. It can be considered that the compensation value with a greater data amount can better compensate the color cast of the display panel under the tie point grayscale. However, it also occupies a greater storage space in the display panel. The compensation value of the display panel comprises at least one of the first compensation value and the second compensation value. When some of the tie point grayscales obtain the first compensation value by the first compensation method and another some of the tie point grayscales obtain the second compensation value by the second compensation method, then the compensation value of the display panel can comprise the first compensation value and the second compensation value.

It can be understood that for difference according to a result of existence of the color cast in the display panel under one tie point grayscale in the present invention, different compensation methods can be adopted to compensate the tie point grayscale to obtain the first compensation value and the second compensation value of the data amount different to prevent the display panel from adopting the same compensation method under all tie point grayscales to generate the above first compensation value or and second compensation value. Actual color cast conditions of tie point grayscales, can be combined to respectively adopt the appropriate first compensation method or second compensation method to compensate each tie point grayscale to simultaneously mitigate the color cast of the display image and lower the storage cost.

Figure 5:
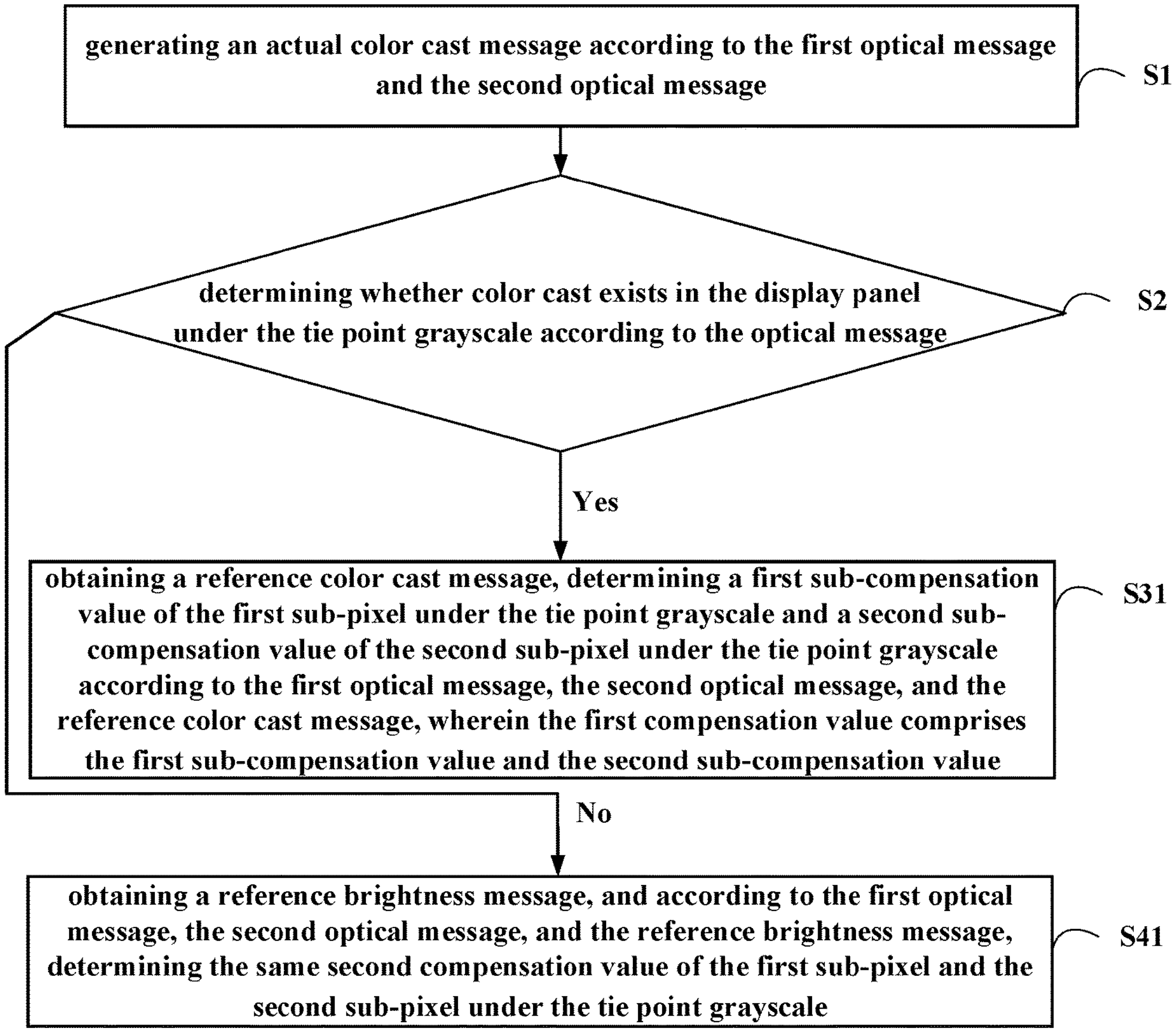
FIG. 5 is a second flowchart of a compensation value generation method provided by the embodiment of the present invention.

In some embodiments, with reference to FIG. 5, the above step S3 can comprise but is not limited to the following step(s).

A step S31 comprises obtaining a reference color cast message, determining a first sub-compensation value of the first sub-pixel under the tie point grayscale and a second sub-compensation value of the second sub-pixel under the tie point grayscale according to the first optical message, the second optical message, and the reference color cast message, wherein the first compensation value comprises the first sub-compensation value and the second sub-compensation value.

It can be understood that at this time because color cast exists in the display panel under the tie point grayscale, so therefore in the adopted first compensation method it is required to consider which color a grayscale image of the display panel is biased toward. It can be known in combination with the above description "converted from the RGB color space to the CIE Lab color space", $\overline{L}^*$, $\overline{a}^*$, $\overline{b}^*$ of the display panel are obtained according to optical parameters of the sub-pixels (except for the first optical message and the second optical message, when a third sub-pixel exists, then it can comprise a third optical message corresponding to the third sub-pixel) to determine a specific color cast condition of a grayscale image displayed by the display panel under the tie point grayscale, and by combining a reference color cast message to calculate out a compensation value corresponding to each of the sub-pixels. The first compensation value comprises a first sub-compensation value and a second sub-compensation value. When a third sub-pixel exists, then it further comprises a third sub-compensation value corresponding to the third sub-pixel. Namely, the first compensation value needs to comprise various sub-compensation values corresponding to various color sub-pixels.

In particular, it can be understood in combination with the above descriptions that the entire display panel or some of the regions in which color cast only exists can adopt the first compensation method. But in any case, when sub-compensation values of different sub-pixels are calculated, it needs to aim at the first sub-optical message (i.e., the brightness value R of the first sub-pixel), a corresponding second sub-optical message (i.e., the brightness value G of the second sub-pixel), and a corresponding third sub-optical message (i.e., the brightness value B of the third sub-pixel) of each of the regions, based on the reference color cast message. For example the first sub-compensation value of the first sub-pixel of each of the regions under the tie point grayscale, the second sub-compensation value of the second sub-pixel of each of the regions under the tie point grayscale, and the third sub-compensation value of the third sub-pixel of each of the regions under the tie point grayscale can be adjusted to change the corresponding first sub-optical message, second sub-optical message, and third sub-optical message till color cast messages calculated from $L^*$, $\overline{a}^*$, $\overline{b}^*$ corresponding to the sub-optical messages of the regions can fulfill being less than the reference color cast message, then at this time, several sub-compensation values serve as final compensation values of sub-pixels of several colors respectively.

In some embodiments, with reference to FIG. 5, the above step S4 can comprise but is not limited to the following step(s).

A step S41 comprises obtaining a reference brightness message, and according to the first optical message, the second optical message, and the reference brightness message, determining the same second compensation value of the first sub-pixel and the second sub-pixel under the tie point grayscale.

It is different that at this time because the display panel under the tie point grayscale no color cast exists, there is no need to consider which color the grayscale image of the display panel is biased toward in the adopted first compensation method, and only entire brightness of the display panel and the reference brightness message need to be considered. The entire brightness can be determined according to the first optical message and the second optical message. For example, the first optical message can comprise first brightness of the first sub-pixel, the second optical message can comprise second brightness of the second sub-pixel, and then the entire brightness can be a sum of the first brightness and the second brightness. When a third sub-pixel exists, on such basis, third brightness corresponding to the third sub-pixel can also be added to obtain entire brightness.

Similarly, for the first sub-optical message (i.e., the brightness value R of the first sub-pixel), a corresponding second sub-optical message (i.e., the brightness value G of the second sub-pixel), and a corresponding third sub-optical message (i.e., the brightness value B of the third sub-pixel) of each of the regions, based on the reference brightness message, a grayscale value of each of the sub-pixels of the region under the tie point grayscale can be adjusted by the same degree till a sum of the first sub-optical message, the second sub-optical message, and the third sub-optical message of the region is equal to reference brightness message. Then, at this time, the same sub-compensation value serves as a final compensation value of the sub-pixel of all colors. Namely, the second compensation value only need to comprise one compensation value corresponding to the sub-pixels of various colors.

Figure 6:
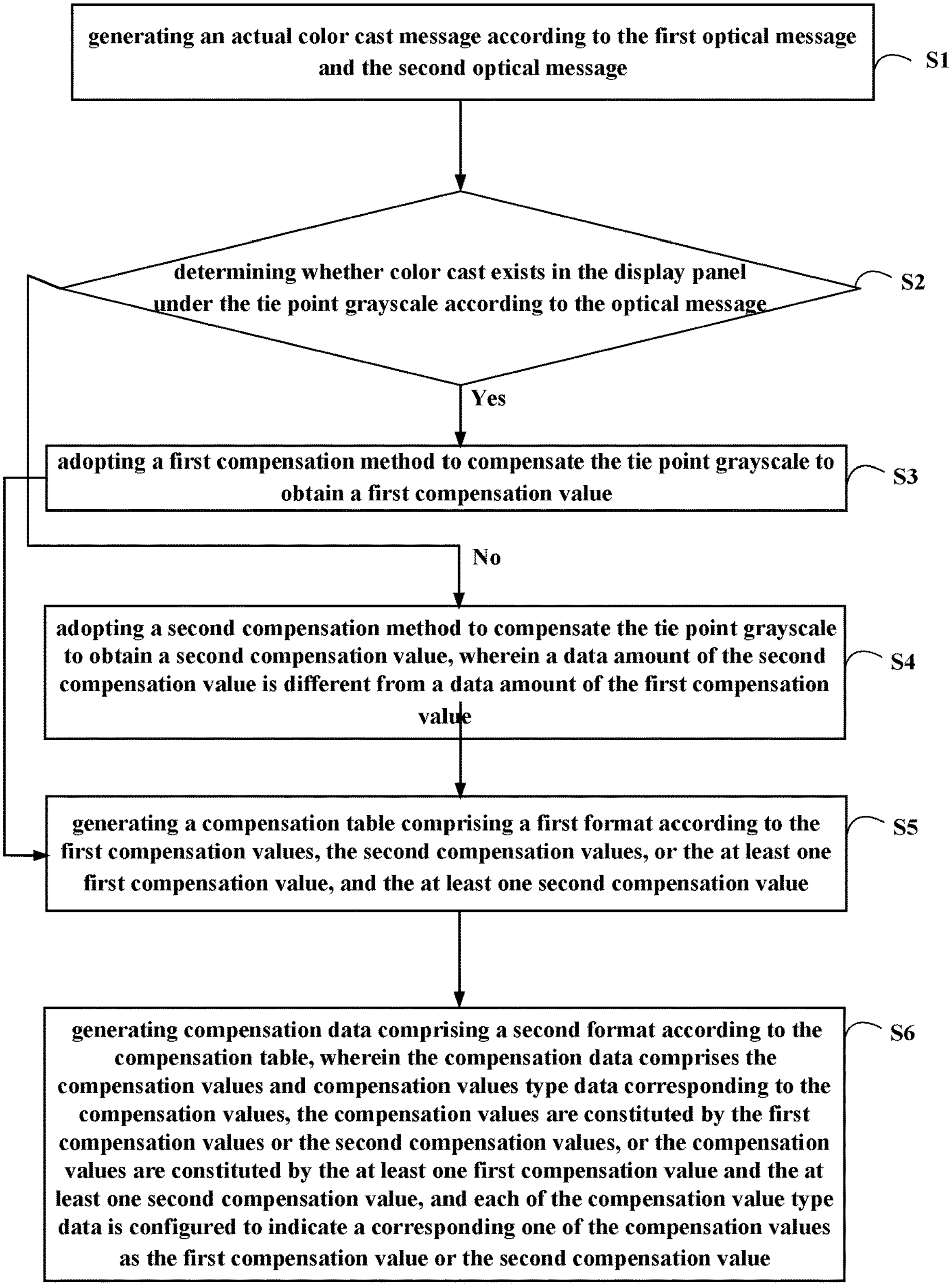
FIG. 6 is a third flowchart of the compensation value generation method provided by the embodiment of the present invention.

In some embodiments, with reference to FIG. 6, after at least one of the above steps S3, S4, the method can comprise but is not limited to the following step(s).

A step S5 comprises generating a compensation table comprising a first format according to the first compensation values, the second compensation values, or the at least one first compensation value, and the at least one second compensation value.

In particular, the first format of the compensation table can be classified into a plurality of sub-compensation tables according to a quantity of the tie point grayscales and types of the sub-pixels. A beginning of the entire sub-compensation tables can comprise a quantity of types and a quantity of divided regions of the sub-pixels. Later, each of the sub-compensation tables can comprise a corresponding value of the tie point grayscale, a corresponding type of the sub-pixel (i.e., color), and a plurality of compensation values of a plurality of regions arranged in an array. Each compensation value can belong to the first compensation value or the second compensation value. The sub-compensation tables can be arranged preferentially according to values of the tie point grayscales. Further, a compensation value under each the same tie point grayscale can be arranged according to an order of the first sub-pixel, the second sub-pixel, and the third sub-pixel. The first format can be but is not limited to a csv format.

It should be noted that even the compensation value of one of the tie point grayscales belongs to the second compensation value, namely, the sub-compensation value of the same color sub-pixel in each of the regions is the same, however corresponding and completely the same three sub-compensation tables are still need to be arranged in an order of the first sub-pixel, the second sub-pixel, and the third sub-pixel. Because, at this time, the compensation table is not stored in the display panel, and would not occupy a memory of the display panel. Also, consistent setting of the format of all the sub-compensation tables can be compatible with the first compensation value and the second compensation value.

A step S6 comprises generating compensation data comprising a second format according to the compensation table, wherein the compensation data comprises the compensation values and compensation values type data corresponding to the compensation values, the compensation values are constituted by the first compensation values or the second compensation values, or the compensation values are constituted by the at least one first compensation value and the at least one second compensation value, and each of the compensation value type data is configured to indicate a corresponding one of the compensation values as the first compensation value or the second compensation value.

In particular, the second format can be a binary format, the compensation data can comprise an index header, a parameter, and the above compensation value. The index header can comprise identification code data, check code data, and compensation value length data. The parameter can comprise region size data and compensation values type data (expressing a corresponding compensation value as a first compensation value or a second compensation value) corresponding to a plurality of tie point grayscales. Furthermore, different regions can correspond to different type compensation values. After the above parameter, the tie point grayscales can be arranged sequentially to correspond to sub-pixels of various colors and correspond to compensation values of regions.

It should be noted that the compensation data can be stored in a storage module of the display panel. Therefore, for different regions under the same tie point grayscale, the same compensation method can be employed to generate a first sub-compensation value (corresponding to the first sub-pixel), a second sub-compensation value (corresponding to the second sub-pixel), and a third sub-compensation value (corresponding to the third sub-pixel) that are all included in the first compensation value. As such, a compensation value type of the compensation data can only be described as a compensation value type according to different tie point grayscales without further being described as compensation value types respectively according to the regions.

Figure 7:
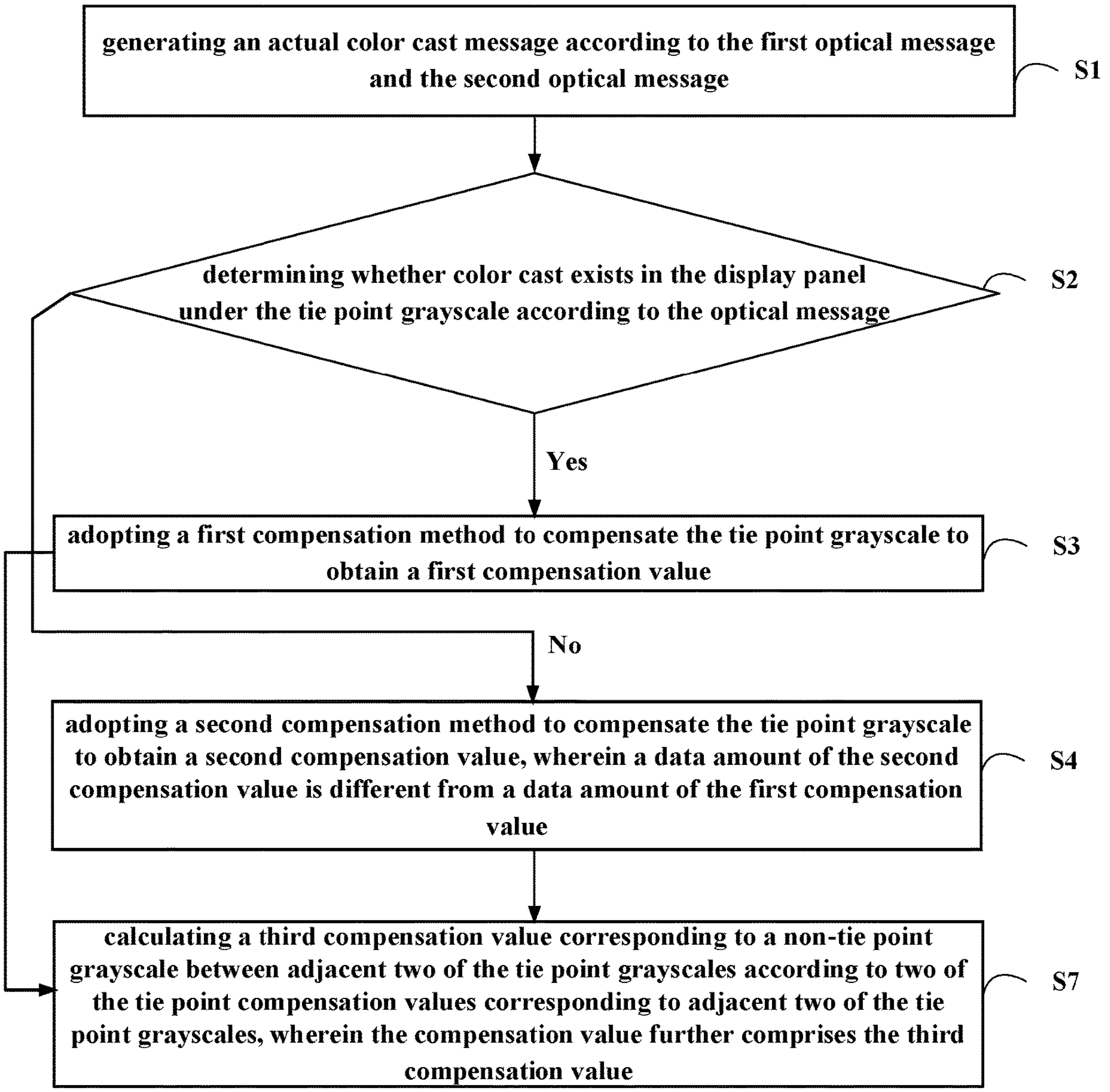
FIG. 7 is a fourth flowchart of the compensation value generation method provided by the embodiment of the present invention.

In some embodiments, with reference to FIG. 7, a quantity of the compensation values is greater than 1, and the compensation values comprise tie point compensation values corresponding to the tie point grayscales. After at least one of the at least one first compensation value (determined by the above step S3) and the at least one second compensation value (determined by the above step S4) are obtained as the tie point compensation values, the method can comprise but is not limited to the following step(s):

A Step S7 comprises calculating a third compensation value corresponding to a non-tie point grayscale between adjacent two of the tie point grayscales according to two of the tie point compensation values corresponding to adjacent two of the tie point grayscales, wherein the compensation value further comprises the third compensation value.

In particular, at this time a quantity of the tie point grayscales can be greater than 1. Therefore, in the step S1, optical messages corresponding to the display panel under tie point grayscales can be obtained. In the step S2, whether color cast exists in the display panel under a corresponding tie point grayscale can be determined according to each optical message. Namely, a condition whether color cast exists in the display panel under each of the tie point grayscales can be determined. The compensation values comprise tie point compensation values corresponding to the tie point grayscales. The tie point compensation values can comprise at least one of at least one first compensation value and at least one second compensation value.

It can be understood that for each of the regions, a first compensation value or a second compensation value corresponding to each tie point grayscale can be calculated out as a corresponding tie point compensation value. Accordingly, a third compensation value of the region corresponding to the non-tie point grayscale between adjacent two of the tie point grayscales can also be calculated out by a non-limiting linear interpolation process according to compensation values corresponding to the two tie point grayscales. At this time, whether types of compensation values corresponding to the two tie point grayscales are the same is irrelevant, a compensation value corresponding to the non-tie point grayscale between the two tie point grayscales is calculated out by a mathematical calculation method according to the two compensation values. Here, a compensation value corresponding to the non-tie point grayscale of each of the regions can be a third compensation value. The third compensation value can be generated by but is not limited to at least one of the first compensation values and the second compensation values stored in the display panel.

Furthermore, the compensation value (the first compensation value or second compensation value) under one tie point grayscale in the above each of the regions can be served as a compensation value of several pixel units in a central region of the regions. Namely, it can be considered that a compensation value of a central region of the regions has been calculated out. At this time, regions among the above "central regions" can be divided into a plurality of non-central regions according to the same size of the above "central region", and a compensation value of each of the "non-central regions" under the tie point grayscale can be determined by linear interpolation according to specific locations of the "non-central region" and adjacent two "central regions" in combination with two compensation values of the two "central regions" under the tie point grayscale.

Similarly, in combination with compensation values of the regions under a non-tie point grayscale, and specification locations of each "non-central region" and adjacent two "central regions", a compensation value of each "non-central region" under the non-tie point grayscale can also be calculated out.

Figure 8:
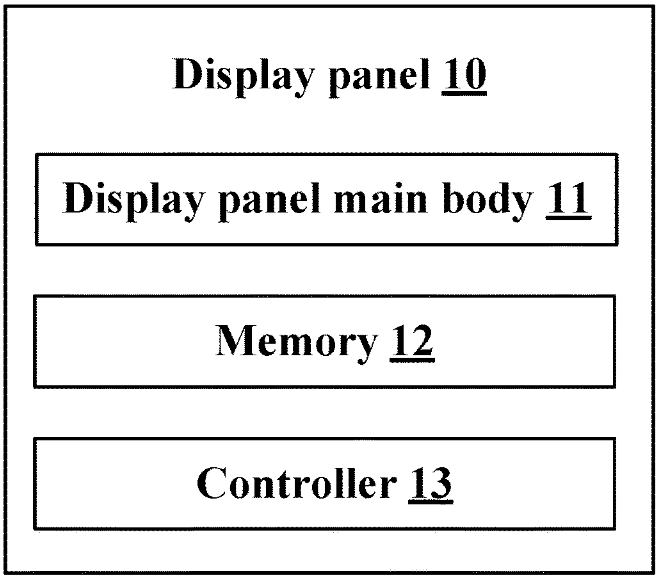
FIG. 8 is a schematic diagram of a display panel provided by the embodiment of the present invention.

With reference to FIG. 8, the present invention also provides a display panel 10, comprising: a display panel main body 11; a memory 12 configured to store any compensation value as described above; and a controller 13 configured to drive the display panel main body 11 to emit light according to any compensation value as described above. Specifically, the display panel can comprise pixel units as described above. What the memory 12 stores can be compensation values of pixel units under each tie point grayscale. When pixel units belong to the above "central region" and its grayscale value belongs to a tie point grayscale, then the controller 13 can directly call a corresponding compensation value to compensate a grayscale of the sub-pixel to further compensate brightness. Otherwise, the controller 13 can need to compensate the grayscale of the sub-pixel according to at least one corresponding compensation value (also may comprise a plurality of compensation values corresponding to a plurality of regions) to further compensate brightness. The controller 13 can comprise at least one of a time controller and a source electrode driver.

Figure 9:
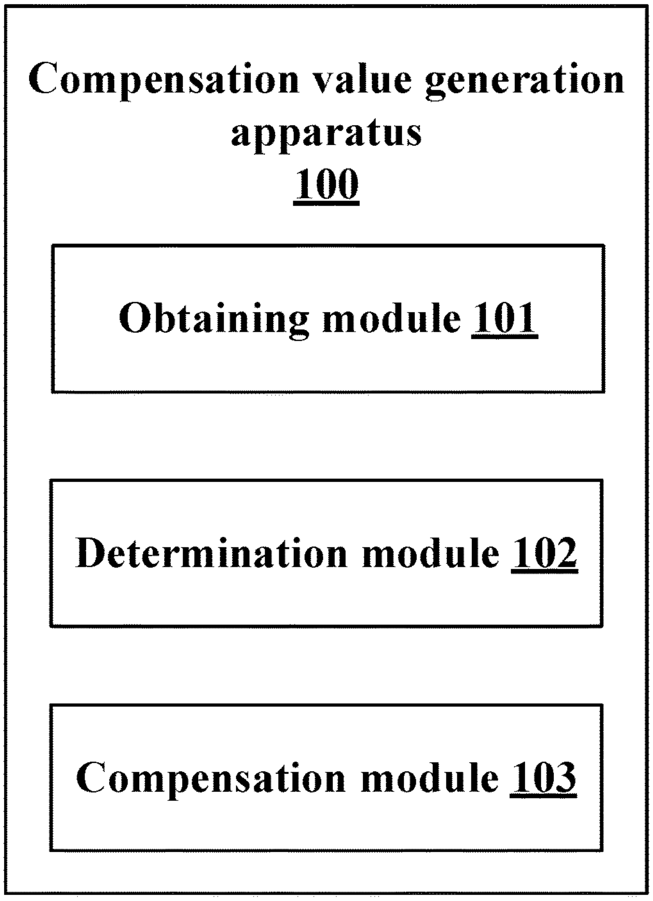
FIG. 9 is a schematic diagram of a compensation value generation apparatus provided by the embodiment of the present invention.

With reference to FIG. 9, the present invention also provides a compensation value generation apparatus 100 comprising: an obtaining module 101 configured to obtain at least one optical message of the display panel under at least one tie point grayscale; a determination module 102 configured to determine whether color cast exists in the display panel under the tie point grayscale according to the optical message; and a compensation module 103 configured to adopt a first compensation method to compensate the tie point grayscale to obtain a first compensation value when the color cast exits in the display panel under the tie point grayscale, and configured to adopt a second compensation method to compensate the tie point grayscale to obtain a second compensation value when no color cast exists in the display panel under the tie point grayscale, wherein a data amount of the second compensation value is different from a data amount of the first compensation value; wherein the compensation value comprises at least one of the first compensation value and the second compensation value.

Specific implementation steps of the obtaining module 101, the determination module 102, and the compensation module 103 of the compensation value generation apparatus can refer to the above descriptions related to the compensation value generation method.

Of course, the compensation value generation method of the present invention can also be implemented by the display panel itself.

The present invention provides a compensation value generation method, an apparatus thereof, and a display panel thereof, the method obtains at least one optical message of a display panel under at least one tie point grayscale, and determines whether color cast exists in the display panel under the tie point grayscale according to the optical message. Under two conditions of existence of the color cast and non-existence of the color cast, a first compensation method is adopted to compensate the tie point grayscale to obtain a first compensation value, and a second compensation method is adopted to compensate the tie point grayscale to obtain a second compensation value, respectively. Also, a data amount of the second compensation value is different from a data amount of the first compensation value. The above method prevents the display panel from using the same compensation method under all tie point grayscales to generate the above first compensation value or second compensation value to mitigate the color cast of the display image while lowering the storage cost.

The compensation value generation method, the apparatus thereof, and the display panel thereof provided by the embodiment of the present invention, are described in detail as above. The principles and implementations of the present application are described in the following by using specific examples. The description of the above embodiments is only for assisting understanding of the technical solutions of the present application and the core ideas thereof. Those of ordinary skill in the art should understand that they can still modify the technical solutions described in the foregoing embodiments or equivalently replace some of the technical features. These modifications or replacements do not make the essence of the technical solutions depart from a range of the technical solutions of the embodiments of the present application.

What is claimed is:

1. A compensation value generation method for generating a compensation value applied to a display panel, wherein the display panel comprises a display panel main body, a memory configured to store a compensation value, and a controller configured to drive the display panel main body to emit light according to the compensation value, and the method is implemented by the display panel main body, the memory, and the controller of the display panel and comprises:

obtaining at least one optical message of the display panel under at least one tie point grayscale from the display panel, wherein the at least one tie point grayscale corresponding to the at least one optical message;

determining whether color cast exists in the display panel under the tie point grayscale according to the optical message;

when the color cast exits in the display panel under the tie point grayscale, adopting a first compensation method to compensate the tie point grayscale to obtain a first compensation value; and when no color cast exists in the display panel under the tie point grayscale, adopting a second compensation method to compensate the tie point grayscale to obtain a second compensation value, a data amount of the second compensation value is different from a data amount of the first compensation value;

wherein the compensation value comprises at least one of the first compensation value and the second compensation value;

wherein the optical message is a light emitting brightness value of one of a plurality of pixel units of the display panel.

2. The compensation value generation method according to claim 1, wherein each of the pixel units at least comprises a first sub-pixel and a second sub-pixel in different colors, the optical message comprises a first optical message corresponding to the first sub-pixel and a second optical message corresponding to the second sub-pixel; and the step of adopting a first compensation method to compensate the tie point grayscale to obtain a first compensation value, comprises:

obtaining a reference color cast message, determining a first sub-compensation value of the first sub-pixel under the tie point grayscale and a second sub-compensation value of the second sub-pixel under the tie point grayscale according to the first optical message, the second optical message, and the reference color cast message, wherein the first compensation value comprises the first sub-compensation value and the second sub-compensation value.

3. The compensation value generation method according to claim 2, wherein the step of adopting a second compensation method to compensate the tie point grayscale to obtain a second compensation value, comprises:

obtaining a reference brightness message, and according to the first optical message, the second optical message, and the reference brightness message, determining the same second compensation value of the first sub-pixel and the second sub-pixel under the tie point grayscale.

4. The compensation value generation method according to claim 2, wherein the step of determining whether color cast exists in the display panel under the tie point grayscale according to the optical message, comprises:

generating an actual color cast message according to the first optical message and the second optical message; and obtaining the reference color cast message, and determining whether color cast exists in the display panel under the tie point grayscale according to the actual color cast message and the reference color cast message.

5. The compensation value generation method according to claim 2, wherein the step of obtaining at least one optical message of the display panel under at least one tie point grayscale, comprises:

dividing the display panel in a plurality of regions; and obtaining at least one first sub-optical message of the first sub-pixel in each of the regions under the at least one tie point grayscale, and obtaining at least one second sub-optical message of the second sub-pixel in each of the regions under the at least one tie point grayscale, wherein the first optical message comprises the at least one first sub-optical message or the first optical message is determined according to the at least one first sub-optical message, and the second optical message comprises the at least one second sub-optical message or the second optical message is determined according to the at least one second sub-optical message.

6. The compensation value generation method according to claim 5, wherein the step of determining whether color cast exists in the display panel under the tie point grayscale according to the optical message, comprises:

generating an actual sub-color cast message correspondingly according to the first sub-optical message and a corresponding one of the at least one second sub-optical message; and obtaining the reference color cast message, and determining whether color cast exists in a corresponding one of the regions under the tie point grayscale according to the actual sub-color cast message and the reference color cast message to determine whether color cast exists in the display panel under the tie point grayscale.

7. The compensation value generation method according to claim 1, wherein a quantity of the compensation value is greater than 1, a plurality of the compensation value comprises a plurality of tie point compensation values corresponding to a plurality of the tie point grayscales, after obtaining at least one of the at least one first compensation value and the at least one second compensation value as the tie point compensation values, the method further comprises:

according to two of the tie point compensation values corresponding to adjacent two of the tie point grayscales, calculating a third compensation value corresponding to a non-tie point grayscale between adjacent two of the tie point grayscales, and the compensation value further comprises the third compensation value.

8. The compensation value generation method according to claim 1, wherein after at least one of the step of adopting a first compensation method to compensate the tie point grayscale to obtain a first compensation value and the step of adopting a second compensation method to compensate the tie point grayscale to obtain a second compensation value, the method further comprises:

generating a compensation table comprising a first format according to the first compensation values, the second compensation values, or the at least one first compensation value, and the at least one second compensation value; and generating compensation data comprising a second format according to the compensation table, wherein the compensation data comprises the compensation values and compensation values type data corresponding to the compensation values, the compensation values are constituted by the first compensation values or the second compensation values, or the compensation values are constituted by the at least one first compensation value and the at least one second compensation value, each of the compensation value type data is configured to indicate a corresponding one of the compensation values as the first compensation value or the second compensation value.

9. The compensation value generation method according to claim 1, wherein the display panel comprises a plurality of pixel units, each of the pixel units at least comprises a first sub-pixel and a second sub-pixel in different colors, the optical message comprises a first optical message corresponding to the first sub-pixel and a second optical message corresponding to the second sub-pixel; and the step of adopting a first compensation method to compensate the tie point grayscale to obtain a first compensation value, comprises:

obtaining a reference color cast message, determining a first sub-compensation value of the first sub-pixel under the tie point grayscale and a second sub-compensation value of the second sub-pixel under the tie point grayscale according to the first optical message, the second optical message, and the reference color cast message, wherein the first compensation value comprises the first sub-compensation value and the second sub-compensation value;

a quantity of the compensation value is greater than 1, a plurality of the compensation value comprises a plurality of tie point compensation values corresponding to a plurality of the tie point grayscales, after obtaining at least one of the at least one first compensation value and the at least one second compensation value as the tie point compensation values, the method further comprises:

according to two of the tie point compensation values corresponding to adjacent two of the tie point grayscales, calculating a third compensation value corresponding to a non-tie point grayscale between adjacent two of the tie point grayscales, and the compensation value further comprises the third compensation value.

10. The compensation value generation method according to claim 9, wherein the step of adopting a second compensation method to compensate the tie point grayscale to obtain a second compensation value, comprises:

obtaining a reference brightness message, and according to the first optical message, the second optical message, and the reference brightness message, determining the same second compensation value of the first sub-pixel and the second sub-pixel under the tie point grayscale.

11. The compensation value generation method according to claim 9, wherein the step of determining whether color cast exists in the display panel under the tie point grayscale according to the optical message, comprises:

generating an actual color cast message according to the first optical message and the second optical message; and obtaining the reference color cast message, and determining whether color cast exists in the display panel under the tie point grayscale according to the actual color cast message and the reference color cast message.

12. The compensation value generation method according to claim 9, wherein the step of obtaining at least one optical message of the display panel under at least one tie point grayscale, comprises:

dividing the display panel in a plurality of regions; and obtaining at least one first sub-optical message of the first sub-pixel in each of the regions under the at least one tie point grayscale, and obtaining at least one second sub-optical message of the second sub-pixel in each of the regions under the at least one tie point grayscale, wherein the first optical message comprises the at least one first sub-optical message or the first optical message is determined according to the at least one first sub-optical message, and the second optical message comprises the at least one second sub-optical message or the second optical message is determined according to the at least one second sub-optical message.

13. The compensation value generation method according to claim 12, wherein the step of determining whether color cast exists in the display panel under the tie point grayscale according to the optical message, comprises:

generating an actual sub-color cast message correspondingly according to the first sub-optical message and a corresponding one of the at least one second sub-optical message; and obtaining the reference color cast message, and determining whether color cast exists in a corresponding one of the regions under the tie point grayscale according to the actual sub-color cast message and the reference color cast message to determine whether color cast exists in the display panel under the tie point grayscale.

14. The compensation value generation method according to claim 9, wherein after at least one of the step of adopting a first compensation method to compensate the tie point grayscale to obtain a first compensation value and the step of adopting a second compensation method to compensate the tie point grayscale to obtain a second compensation value, the method further comprises:

generating a compensation table comprising a first format according to the first compensation values, the second compensation values, or the at least one first compensation value, and the at least one second compensation value; and generating compensation data comprising a second format according to the compensation table, wherein the compensation data comprises the compensation values and compensation values type data corresponding to the compensation values, the compensation values are constituted by the first compensation values or the second compensation values, or the compensation values are constituted by the at least one first compensation value and the at least one second compensation value, each of the compensation value type data is configured to indicate a corresponding one of the compensation values as the first compensation value or the second compensation value.

15. A display panel, comprising:

a display panel main body;

a memory configured to store a compensation value generated by the compensation value generation method according to claim 1; and a controller configured to drive the display panel main body to emit light according to the compensation value generated by the compensation value generation method according to claim 1.

* * * * *